(12) United States Patent
Giampietro et al.

(10) Patent No.: US 12,524,910 B2
(45) Date of Patent: Jan. 13, 2026

(54) METHODS AND ARRANGEMENTS FOR ASSESSING CAMERA SYSTEM PERFORMANCE

(71) Applicant: Digimarc Corporation, Beaverton, OR (US)

(72) Inventors: James Nicholas Giampietro, West Linn, OR (US); Jerry Allen McMahan, Jr., Oakwood, OH (US)

(73) Assignee: Digimarc Corporation, Beaverton, OR (US)

( * ) Notice: Subject to any disclaimer, the term of this patent is extended or adjusted under 35 U.S.C. 154(b) by 691 days.

(21) Appl. No.: 17/833,405

(22) Filed: Jun. 6, 2022

(65) Prior Publication Data

US 2023/0394706 A1 Dec. 7, 2023

(51) Int. Cl.
| | |
|---|---|
| *G06T 7/80* | (2017.01) |
| *G06K 19/06* | (2006.01) |
| *G06T 7/00* | (2017.01) |
| *H04N 17/00* | (2006.01) |
| *H04N 25/615* | (2023.01) |

(52) U.S. Cl.
CPC .......... *G06T 7/80* (2017.01); *G06K 19/06037* (2013.01); *G06T 7/0002* (2013.01); *H04N 17/002* (2013.01); *H04N 25/615* (2023.01); *G06T 2207/30168* (2013.01); *G06T 2207/30204* (2013.01)

(58) Field of Classification Search
CPC ..................... G06T 7/80; G06T 7/0002; G06T 2207/30168; G06T 2207/30204; H04N 25/615; H04N 1/002; G06K 19/06037

USPC .......................................................... 382/275
See application file for complete search history.

(56) References Cited

U.S. PATENT DOCUMENTS

| | | | |
|---|---|---|---|
| 6,590,996 B1 | 7/2003 | Reed | |
| 7,443,537 B2 | 10/2008 | Reed | |
| 7,483,547 B2 | 1/2009 | Hannigan | |
| 9,245,308 B2 | 1/2016 | Reed | |
| 9,410,827 B2 | 8/2016 | Ghazizadeh | |
| 10,593,007 B1 | 3/2020 | Long | |
| 11,062,108 B2 | 7/2021 | Bradley | |
| 11,250,535 B1 * | 2/2022 | Bai | G06T 1/005 |
| 2019/0378235 A1 * | 12/2019 | Kamath | H04N 1/3232 |

OTHER PUBLICATIONS

NPL: Results Publication Date Range: Nov. 14, 1996 to Jan. 23, 2025.*
Burns, Slanted-edge MTF for digital camera and scanner analysis., Proc. IS&T Conference, pp. 135-138, Society for Imaging Science & Technology, 2000.

(Continued)

*Primary Examiner* — Quang N Vo
(74) *Attorney, Agent, or Firm* — Klarquist Sparkman, LLP

(57) ABSTRACT

Performance metrics for an imaging system are assessed in the field, without the need for carefully-controlled conditions, such as lighting. In some embodiments, a hand-held test target is used to measure MTF, and to identify any undesired noise-reduction operation applied by an image signal processor. A metric-based heuristic enables prediction of whether an imaging system will be suitable to detect and decode a digital watermark signal of a particular resolution. A variety of other features and arrangements are also detailed.

13 Claims, 9 Drawing Sheets

(56) References Cited

OTHER PUBLICATIONS

Cross-correlation, Wikipedia, Apr. 2022.
Detection of ArUco Markers, OpenCV.org tutorial, Mar. 12, 2022, retrieved from WebArchive.
Homography, Wikipedia, Feb. 2022.
International Standard ISO 12233, Photography—Electronic Still Picture Imaging—Resolution and Spatial Frequency Responses, 2017.
Nayar, et al, Image spotting of 3D objects using parametric eigenspace representation, Proc. 9th Scandinavian conference on image analysis, pp. 325-332, 1995.
Optical transfer function, Wikipedia, Apr. 2022.

\* cited by examiner

METHODS AND ARRANGEMENTS FOR ASSESSING CAMERA SYSTEM PERFORMANCE

TECHNICAL FIELD

The present technology concerns camera systems and image analysis.

Background and Introduction

The performance of an imaging system is characterized, in part, by its modulation transfer function (MTF). In lay terms, MTF is a measure of the imaging system's capability to resolve fine features. More technically, MTF is the magnitude of the Fourier transform of the system's point spread function.

ISO Standard 12233 defines a method for estimating MTF of digital imaging systems, using the "slanted edge" (also known as the "knife edge") technique, i.e., based on an image of a straight contrast boundary. FIGS. 1A and 1B are excerpts from that standard and detail the slanted edge technique in flow chart form.

The ISO standard contemplates that data to compute the MTF is gathered in a laboratory setting, e.g., with controlled lighting, and with a test target mounted in a fixed easel, positioned from the image sensor by a measured distance, and oriented parallel to the image sensor. With industrial camera models, one sample model is typically tested, and its results are published as representative of all cameras of that model. However, due to manufacturing variations, the MTF of any given camera can vary substantially from the published specifications.

It is sometimes desirable to test the MTF of a camera in the field, e.g., to determine whether a performance issue of a system (e.g., a machine vision inspection system, or a supermarket barcode reading system) is due to sub-standard imaging capabilities of the camera, or due to some other factor. However, standardized testing protocols are sometimes difficult to implement once a camera is installed in a system, e.g., behind a glass platen, with uncontrollable lighting.

There is the further complication that imaging systems sometimes include an image signal processor (ISP) that "enhances" the camera-captured imagery, e.g., by applying de-noising or sharpening filters to the imagery, in accordance with stored firmware. In some instances, this "enhancement" can degrade use of the imagery for a particular application—such as decoding digital watermark signals from retail product packaging. The firmware may be updated from time to time, e.g., to fix bugs, and these firmware updates can sometimes also introduce "enhancements" that lead to an impairment in system performance for the intended imaging application.

To address these and other challenges, the present technology provides improved methods of assessing imaging system performance in the field.

These and other features and advantages of the technology will be more readily apparent from the following detailed description, which proceeds with reference to the accompanying figures.

DETAILED DESCRIPTION

Figure 1A:
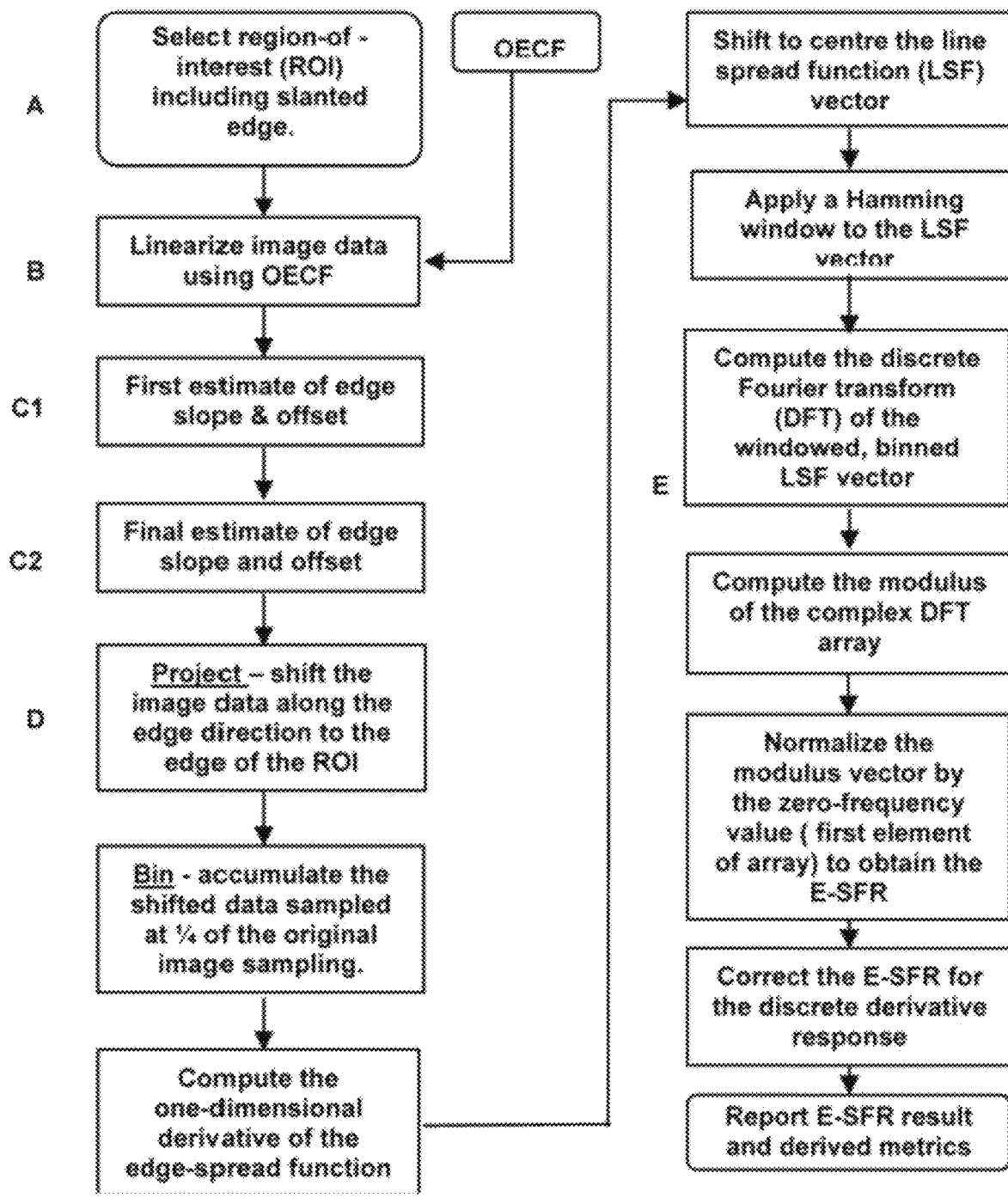
FIGS. 1A and 1B detail the slanted edge technique for estimating modulation transfer function, as further detailed in ISO Standard 12233.
Figure 1B:
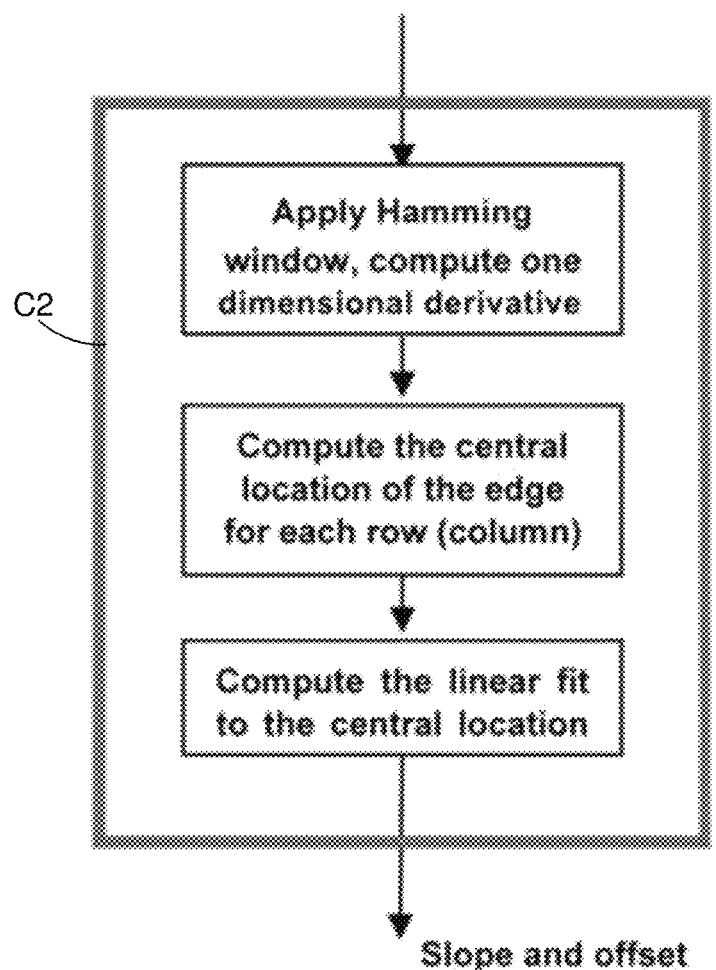
Figure 2:
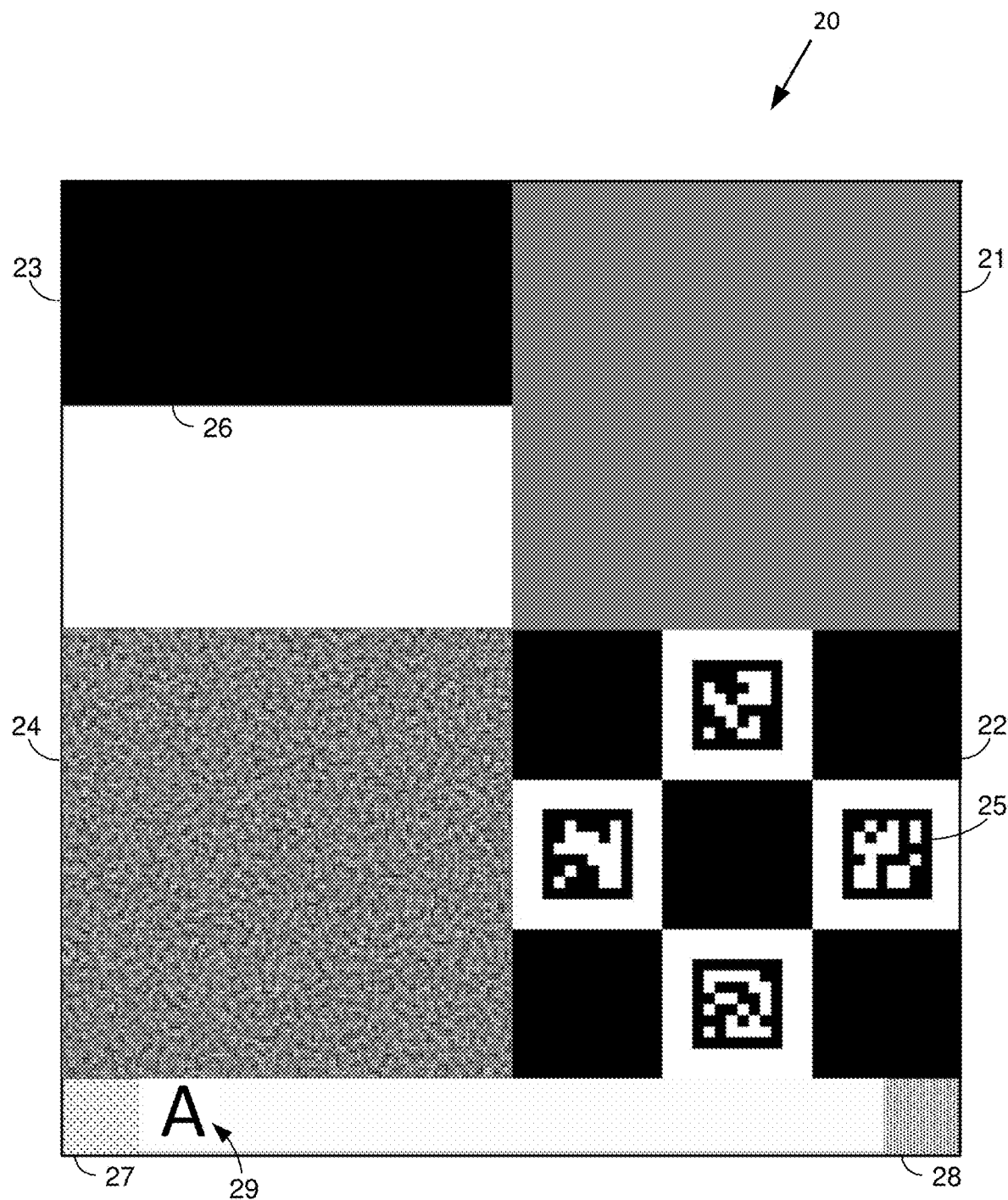
FIG. 2 shows an optical test card in accordance with certain aspects of the present technology.

FIG. 2 shows a sample test card 20 that can be employed in certain implementations of the present technology. The card measures four inches across (and slightly taller vertically) and is comprised primarily of four regions 21, 22, 23 and 24. The card is printed on white stock, and is adhered to a rigid planar member, such as a glass or plastic surface, to assure planarity.

Region 21 is printed with a uniform (flat) tone. Typically, mid-grey is used, e.g., of value 128 in an 8-bit digital system. That is, its luminance (density) is 0.5 on a scale ranging between for black and 1 for white. Other values of grey can alternatively be used. So can other uniform, non-grey tones, as detailed below. Physically, region 21 is desirably coated with a flood of ink, to assure uniform coverage, instead of being printed with an ink jet or other apparatus that may introduce local variations into the tone. As detailed below, this region serves as a reference, e.g., to evaluate noise introduced into captured imagery by a camera system.

Region 22 comprises one or more markers (fiducials). In the illustrated card this region comprises a checkerboard pattern combined with four ArUco (Augmented Reality University of Cordoba) markers 25. Such patterns are known to be useful for camera calibration and pose estimation, and tools for determining pose based on imagery depicting these patterns are commonly available, e.g., in popular computer vision libraries such as OpenCV.

The depicted markers also serve to encode a payload. Each of the four ArUco patterns 25 on card 20 can represent any of 50 IDs, so the combined code can represent over 6 million values. (In a sample embodiment, this full payload capacity is not used. Instead, each of the four codes is employed to represent a decimal digit of 0-9, providing a up to 10,000 unique IDs.) This payload capacity is employed to convey information about the card, such as a serial number, a human-readable description, the resolution of a watermark used for noise pattern 24—together with its payload, the type of watermark (e.g., chroma or luma) and its enhancement strength, etc. In some implementations, this information is literally encoded by different fields in the payload. In other implementations, this card ID serves as an identifier of a remote database record that contains such metadata.

Region 23 is a contrast pattern defining a straight boundary, or knife edge, 26, between adjoining black and white regions. As with the uniform tone region, the black region is desirably printed with a flood of black ink to avoid local patterning.

Region 24 is a noise pattern. In a particular example, it is an array of 600×600 8-bit greyscale pixels, of pseudo-random values. In one such example the values have a Gaussian (normal) distribution around a mean of 128. In another such example the values are uniformly distributed. No particular statistics of the noise pattern are required, although high frequency spatial frequency content is desirable.

The mean value of the noise pattern 24 desirably matches the tone of the uniform region 21. For example, if the uniform region has a greyscale value of 110, then noise pattern 24 may be a Gaussian or uniform noise pattern distributed around a greyscale value of 110. If the uniform region has a bluish-grey 8-bit RGB value of {100, 120, 140}, then the noise pattern can comprise an RGB noise pattern with a mean red value of 100, a mean green value of 120, and a mean blue value of 140. Etc.

In some instances, the noise pattern is a 2D machine readable code that has a noise-like appearance. An example is a digital watermark pattern. Many of the digital watermarks detailed in the patent documents cited below include a payload component that is XOR'd with a noise pattern, yielding a noise-like aspect to the watermark pattern. In some such implementations, the digital watermark pattern comprises local variations in luminance, i.e., a "luminance" (or "luma") watermark. In other implementations the pattern is defined by local variations in color, i.e., a "chrominance" (or "chroma") watermark. These two types of watermarks are detailed in the documents referenced below.

At the bottom of the depicted card 20 are two color patches 27, 28. These can be printed with two inks, e.g., used in a chrominance watermark. The card also can include one or more human readable indicia, 29, to identify the card and its properties.

Figure 3:
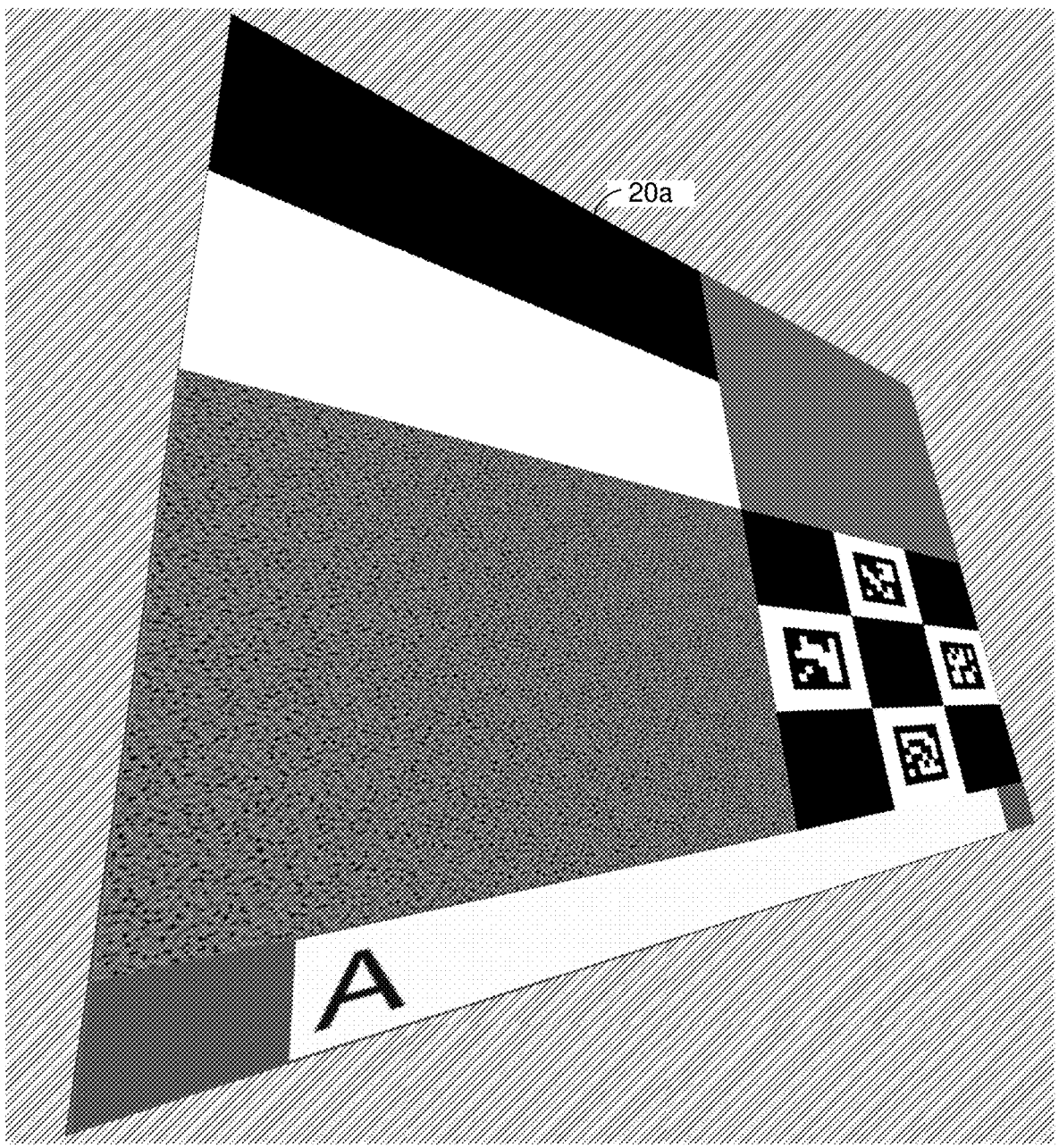
FIG. 3 shows a depiction of the test card of FIG. 2 as captured by a camera, illustrating perspective distortion.

FIG. 3 shows card 20 as it may be depicted in imagery captured by a camera. The figure illustrates viewpoint distortion, sometimes termed "perspective distortion." Lines that are of equal length in the card 20 shown in FIG. 2 (termed the "ground truth image"), are not of equal length in the card 20a shown in FIG. 3 (termed the "raw sample image"). Similarly, angles depicted in the ground truth image are not preserved in the raw sample image. Furthermore, lines that were parallel in the ground truth image are not parallel in the raw sample image. However, as shown by the grey lines in FIG. 4, there is a correspondence, or mapping, by which each point in the ground truth image has a counterpart point in the raw sample image. This mapping is termed a homography, and is expressed as a 3×3 matrix, as is familiar to artisans.

In accordance with one aspect of the technology, the MTF of a camera is estimated from perspectively-distorted imagery of a test card, collected in the field, without correcting for the distortion.

Figure 4:
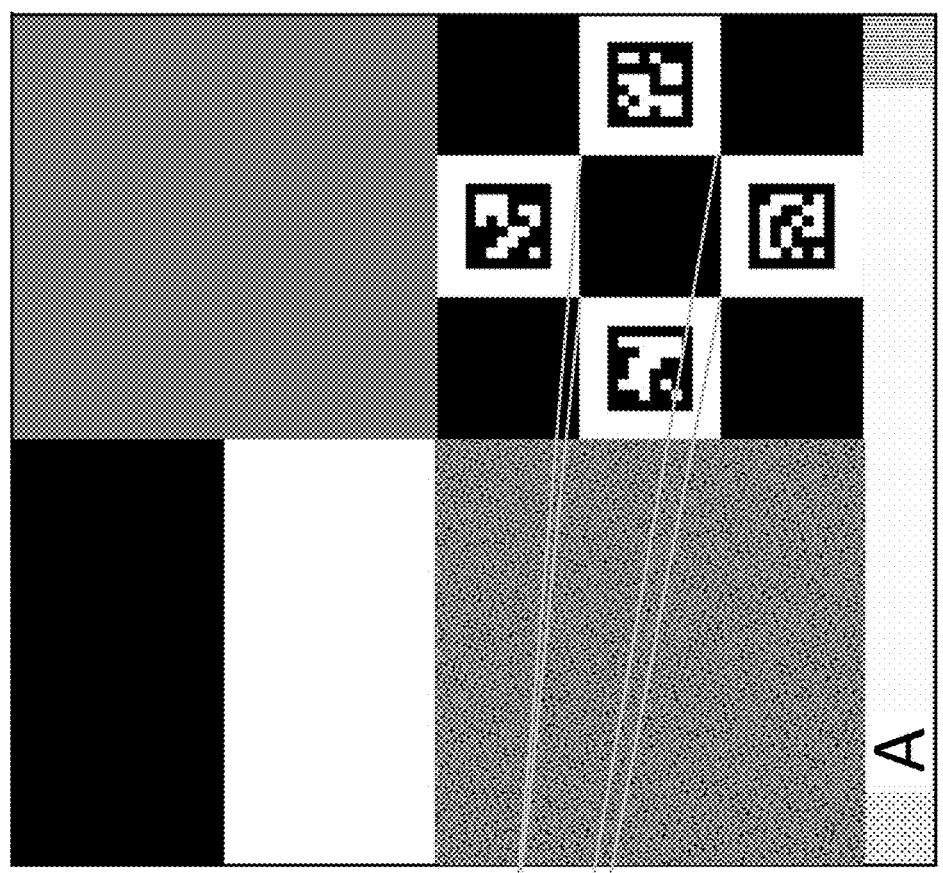
FIG. 4 shows a mapping of keypoints between the camera-depicted test card of FIG. 3, and the "ground truth" test card of FIG. 2.
Figure 4:
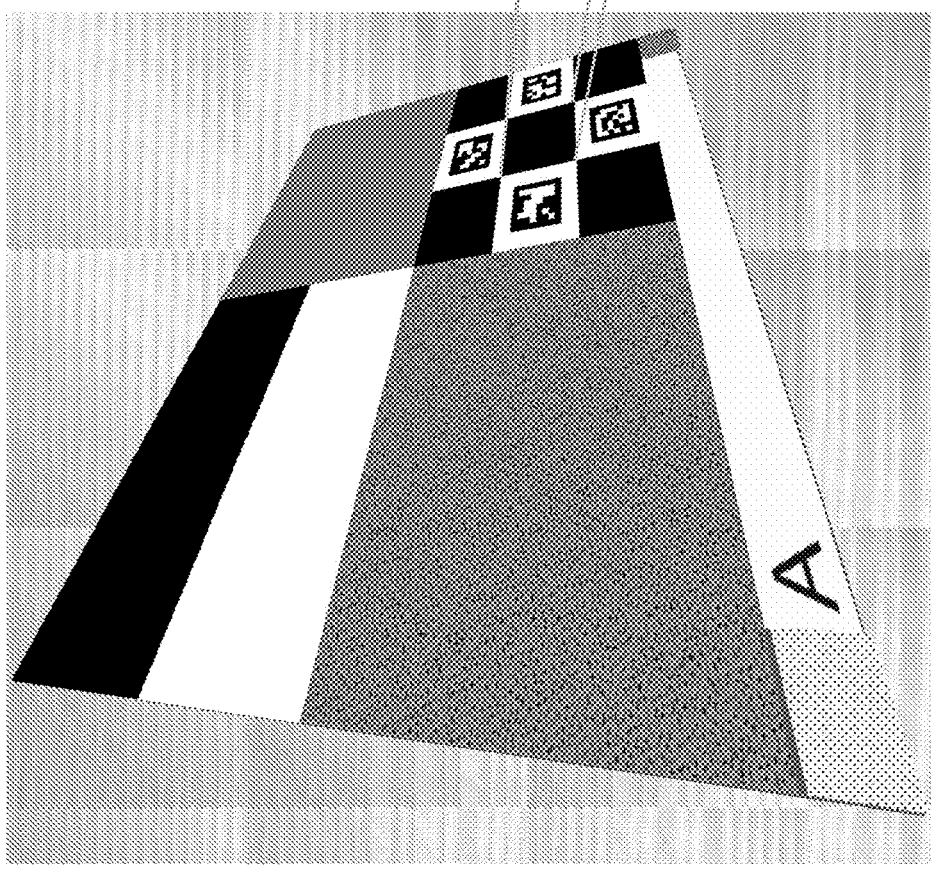

More particularly, such a method can start with estimating the homography that spatially-relates the raw sample image to the ground truth image. This involves locating, in the raw sample image 20a, multiple keypoints that are readily mapped to corresponding keypoints in the ground truth image 20. In FIG. 4, these points can be the corners of the central checkerboard square (i.e., the endpoints of the grey lines), but other keypoints (typically corners) can naturally be used.

In an illustrative embodiment, the ArUco markers are found by using the OpenCV function "arucodetectMarkers."

Then the OpenCV function "arucodetectCharucoDiamond" is called to obtain coordinates of the four central corner points. A pair of pixel coordinates {x,y} is thereby identified for each such keypoint in the raw sample image, and a corresponding pair of pixel coordinates {i,j} is identified for each such keypoint in the ground truth image:

|  | Coordinates in Raw Sample Image | Coordinates in Ground Truth Image |
| --- | --- | --- |
| First Point | $\{x_1, y_1\}$ | $\{i_1, j_1\}$ |
| Second Point | $\{x_2, y_2\}$ | $\{i_2, j_2\}$ |
| Third Point | $\{x_3, y_3\}$ | $\{i_3, j_3\}$ |
| Fourth Point | $\{x_4, y_4\}$ | $\{i_4, j_4\}$ |

The pixel coordinates of these paired keypoints in the two images are then used to estimate the homography matrix. Applicant prefers use of the familiar singular value decomposition (SVD) method, but there are others (e.g., based on least squares). OpenCV has a "findHomography" function that implements the SVD method, in conjunction with RANSAC. Python code for such function is also available from public repositories such as Github, e.g., in the "Homography" repository of "Towardsautonomy."

Figure 5:
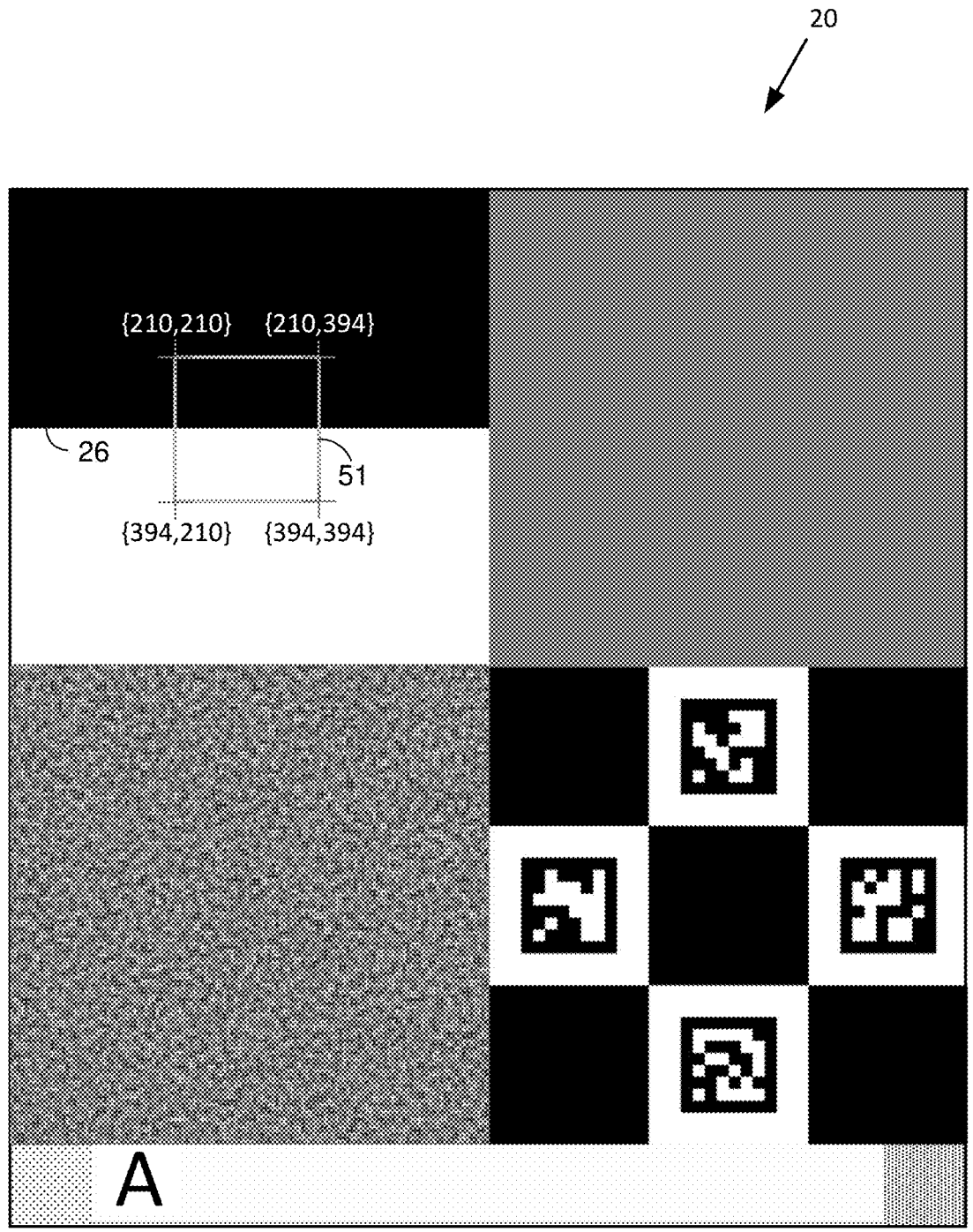
FIG. 5 shows a "region of interest" (ROI) that encompasses a knife edge boundary in the test card of FIG. 2.

Referring to FIG. 5, an excerpt 51 within the ground truth image 20, which spans the boundary 26, is identified. Excerpt 51 is most-commonly established in advance, by fixed coordinates stored in the system software. For example, if the test card comprises an array of 1300 rows by 1200 columns of pixels (as may be typical if the card printed at 300 pixels per inch), and if {row,column} numbering starts in the top left, then the four corners of excerpt 51 may have pixel coordinates {210,210}, {394, 210}, {394,394} and {210,394}, as shown in FIG. 5.

Excerpt 51— sometimes termed a region of interest (ROI)— is square in this example, but other shapes can be used.

Figure 6:
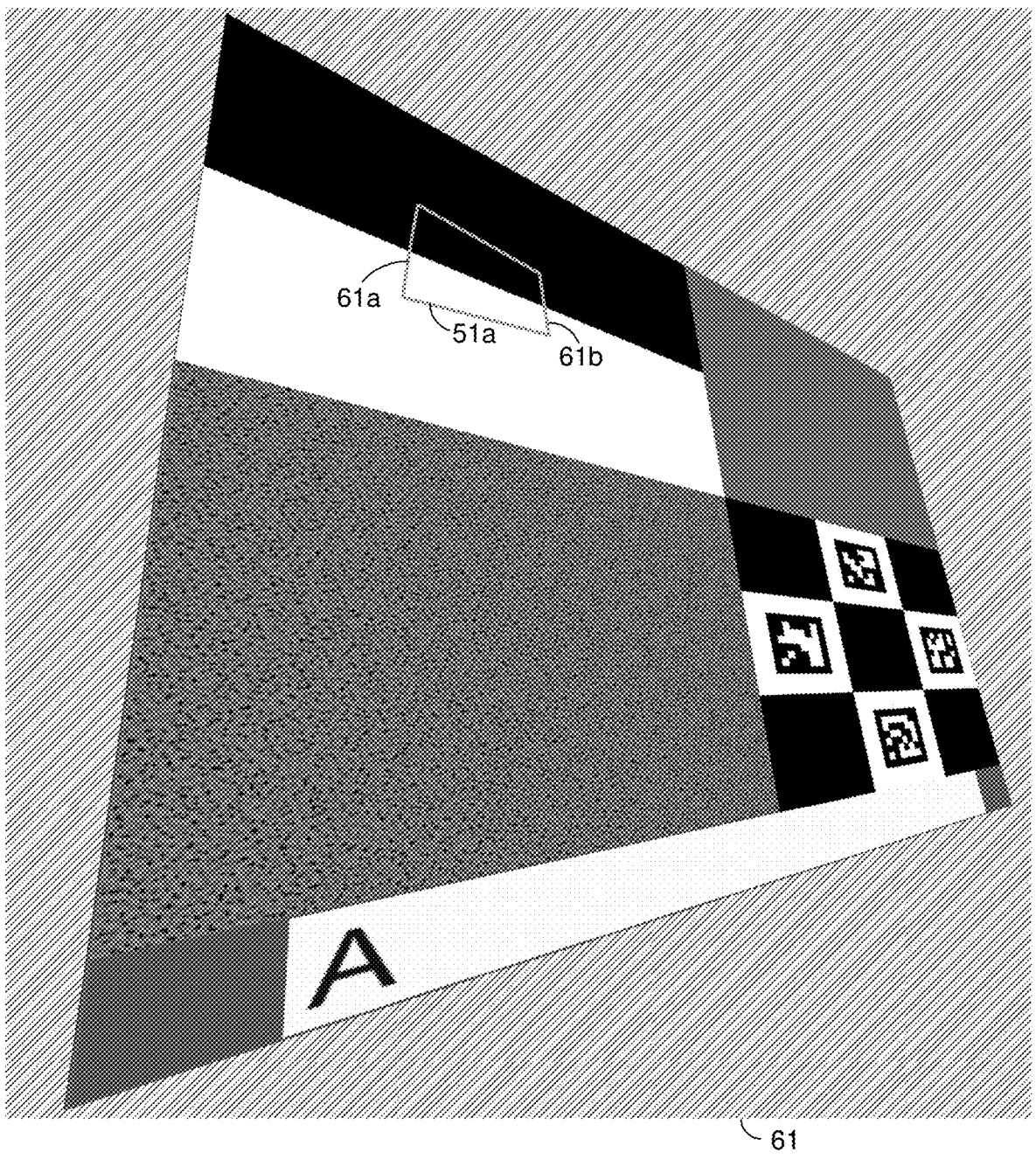
FIG. 6 identifies a patch of camera-captured ("raw sampled") imagery depicting the region of interest.

The earlier-determined homography is then used to map these four corner pixel coordinates for the ROI 51 in the ground truth image 20, into corresponding pixel coordinates within the raw sample image 20a. This operation typically identifies a differently-shaped region of interest 51a within the raw sample image data, as shown in FIG. 6. Unlike the ROI 51 in the ground truth image, the ROI 51a that is projected into the raw sample image space does not align along rows and columns of the raw sample image data. That is, the four sides of the projected ROI 51a are not parallel to the sides of the camera-captured image frame 61.

We next identify a superset of pixels in the raw sample image 20a that encompasses the projected ROI 51a. To do this we identify the maximum and minimum row numbers spanned by the projected ROI 51a, and likewise for the maximum and minimum column numbers. The two row coordinates are each paired with both of the two column coordinates, defining four corner points of a rectangular patch of pixels that includes all of the ROI 51a area, and more. This patch is shown by the dashed rectangle 71 in FIG. 7. This rectangular array of pixels in the raw camera data is then passed to a programmed processor, which applies the earlier-referenced slant-edge MTF estimation function.

Importantly, the image data on which the MTF estimation function is based, although perspectively distorted, is not first processed to remove the distortion. Any such processing (e.g., by applying the earlier-determined homography to map back into the coordinate system of the ground truth image) involves resampling the camera-captured data, which in turn involves interpolating between camera-sensed pixel values. Interpolation is necessarily an estimate, and applicant has found that such estimation introduces noise that can give misleading MTF results.

The slant edge technique for determining MTF desirably uses an edge oriented at a slight angle with respect to the orientation of rows (or columns) of photodetectors in the camera sensor. An angle between 2 and 10 degrees is exemplary. In an embodiment in which a card is manually waved, by a human operator, within the camera's field of view, each captured frame is analyzed to estimate the angle of the knife edge, relative to the photosensor rows. This is readily accomplished by determining the angle of a line connecting the mid-points of two sides 61a, 61b of the region of interest 51a. Image frames in which this angle is between 2 and 10 degrees (and −2 to −10 degrees) are analyzed by the slant edge technique to obtain an estimate of MTF. Other image frames are disregarded—for the MTF analysis.

Figure 8:
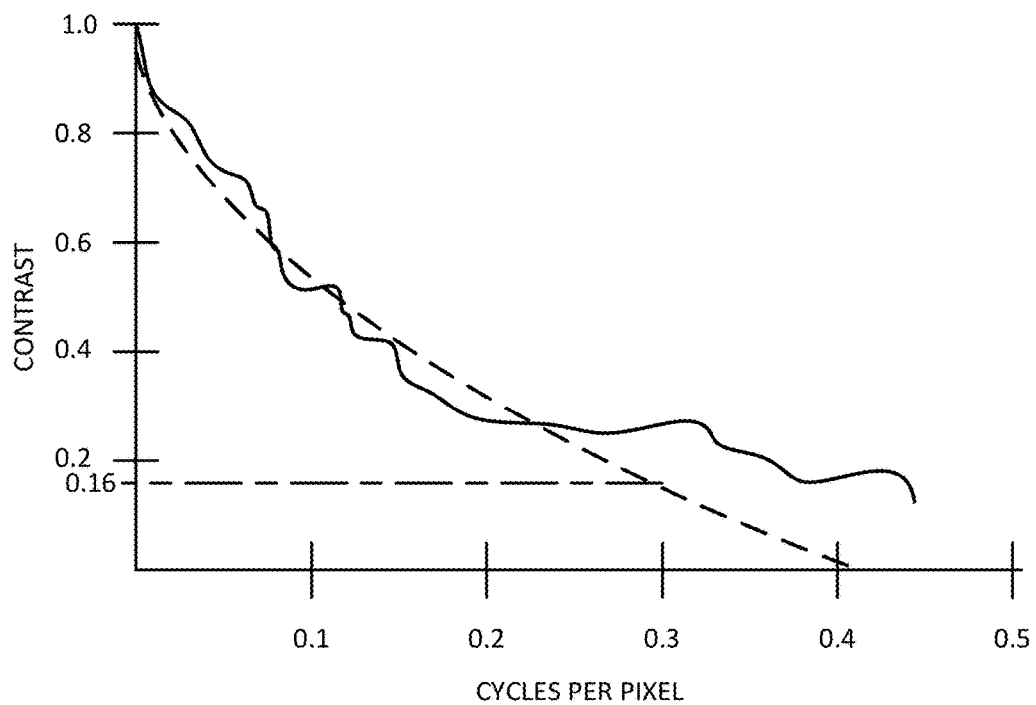
FIG. 8 shows contrast sensitivity curves as may be produced in accordance with the present technology, including use of a test criterion at 0.3 cycles per pixel.

As is familiar, the MTF results yield the camera system's contrast function at different spatial frequencies (which here can be measured in cycles per pixel, up to the Nyquist limit). This data can be plotted as a curve, e.g., shown by the solid line in FIG. 8. As can be seen, the measurement is typically noisy. This is often due to the field environment in which the test is conducted, e.g., with the test card being held in an operator's hand, and with uneven card illumination. Desirably, the measurement is repeated dozens or hundreds of times, e.g., by capturing frames of imagery in a video mode, while the target is manually-moved to different locations within the camera's field of view. By averaging dozens or hundreds of such curves, a more representative MTF curve can be obtained, e.g., as shown by the dashed line in FIG. 8.

Applicant has found that the suitability of a camera system for detecting and decoding particular digital watermark patterns from retail packaging in supermarket applications can be predicted by applying a heuristic to the MTF curve. In particular, for detecting/decoding chrominance digital watermarks at a resolution of 150 watermark elements ("waxels") per inch, applicant has found that the contrast value at a target spatial frequency of 0.3 cycles per pixel is predictive. If the system exhibits a contrast value below 0.2 at this frequency, then applicant finds that the captured imagery is not suitable for reliable decoding/detecting of this type of watermark. In the FIG. 8 example, the camera would be judged not suitable, since the contrast function at the target frequency of 0.3 cycles per pixel is about 0.16. Similar criteria, with contrast or spatial frequency values, can be used for other types of watermarks (or other 2D symbologies). We call the contrast sampled from MTF at the target cycles per pixel value the "MTF Score."

This heuristic has been found to vary inversely with captured watermark resolution (in waxels per inch, or "WPI"). Captured watermark resolution, in turn, varies with distance between the camera and the test card. That is, if the distance between the test card and the camera increases beyond the typical imaging range (so that the watermark spans a smaller fraction of the camera field of view), then the waxels per inch value increases, e.g., from 150 to 200. In this more different imaging circumstance, we do not use a target spatial frequency of 0.3 cycles per pixel. Instead, the spatial frequency at which a contrast value of 0.2 should be achieved is adjusted by the ratio of the two resolutions (200/150) waxels per inch. That is, the spatial frequency value of 0.3 is changed by a factor of 4/3, yielding a target spatial frequency value of 0.4 cycles per pixel. So at this greater imaging distance, the heuristic is met if the MTF shows a contrast value of 0.2 at a spatial frequency of 0.4 cycles per pixel.

Inversely, if the test card is positioned more closely to the camera than usual, the watermark features grow larger, reducing the waxels per inch. In this imaging environment, the necessary modulation rate for transferring watermark data changes in the other direction; that is, the spatial period of waveforms appear larger on the sensor. If the watermark resolution drops from the nominal 150 waxels per inch to 120 WPI, then the target contrast value of 0.2 should be achieved at a lower spatial frequency of $$0.3 \times \left(\frac{120}{150}\right),$$

or 0.24 cycles per pixel.

The earlier-determined homography includes a scale parameter that indicates the distance between the camera and the test card. With this scale information, the heuristic can readily be adapted to the particular camera-card distance of any image frame. Thus, if the test card is manually moved within the camera's field of view at varying distances, while camera frames are being captured, then the contrast curve derived from each captured frame can be assessed to provide a separate prediction of whether the camera MTF is adequate for watermark reading, using the distance-adapted heuristic. These predictions can, in essence, be treated as independent "votes" as to whether the camera system is suitable for the intended watermark reading function. The greater the percentage of votes indicating that the camera system is suitable, the more likely the camera system is, indeed, suitable.

Figure 9:
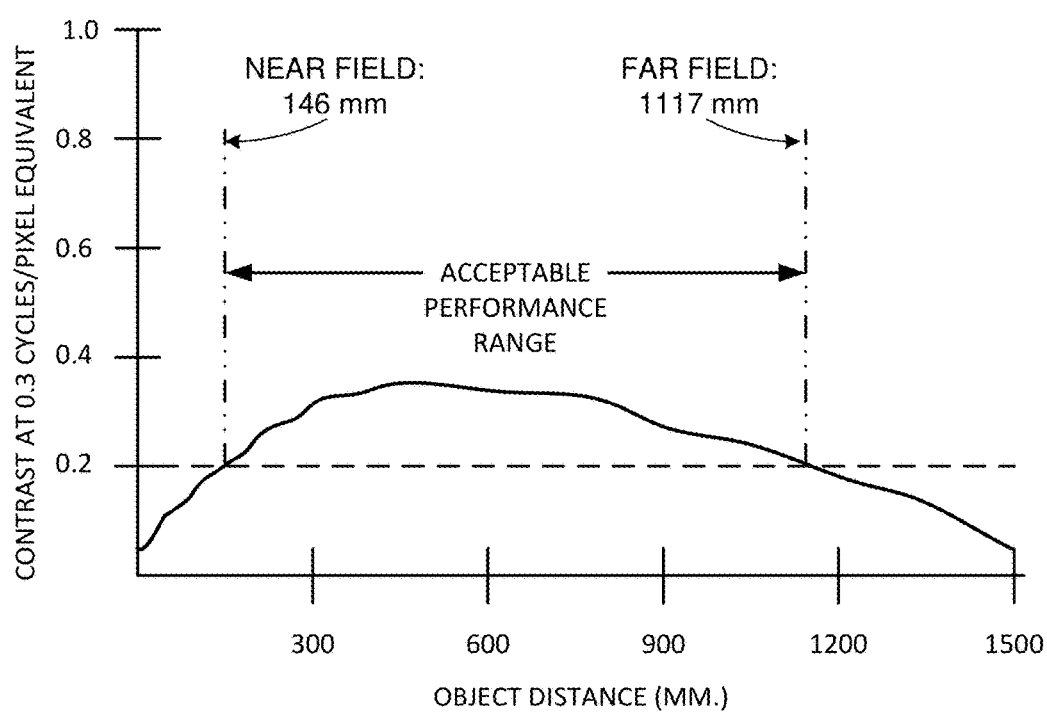
FIG. 9 is a plot showing a contrast-acceptable depth of field curve.

The MTF Scores can be directly correlated with the computed distance of the test card (ascertained using the fiducial), and fit to a biased Gaussian function to produce a depth-of-field analogue, similar to but distinct from the MTF50 heuristic sometimes used to compute canonical depth of field (which does not maximize contrast at a specific cycles per pixel value, but maximizes the cycles per pixel at which the MTF contrast is 0.5). FIG. 9 shows a contrast-acceptable depth of field curve that results. Each captured image frame that depicts the knife edge oriented within the preferred range of angles is assessed to determine its distance from the camera. The nominal target of 0.3 cycles per pixel is adjusted, as described above, and the contrast value at this target spatial frequency is determined. For each distance (e.g., binned in groups of, e.g., 10 mm), the resulting contrast values are averaged. In the aggregate, a curve like that shown in FIG. 8 results—showing the mean contrast value determined for each distance. This curve defines the nearest and farthest distances at which the target contrast value of 0.2 is achieved (at the distance-adjusted target spatial frequency), thereby defining a depth of field range over which the camera is predicted to yield acceptable performance.

A different aspect of the present technology detects image impairment that may not be revealed by MTF, e.g., unintended processing applied by an image signal processor, such as de-noising. This aspect of the technology is based on signal measurements derived from the uniform (flat) region, and the noise region.

Figure 7:
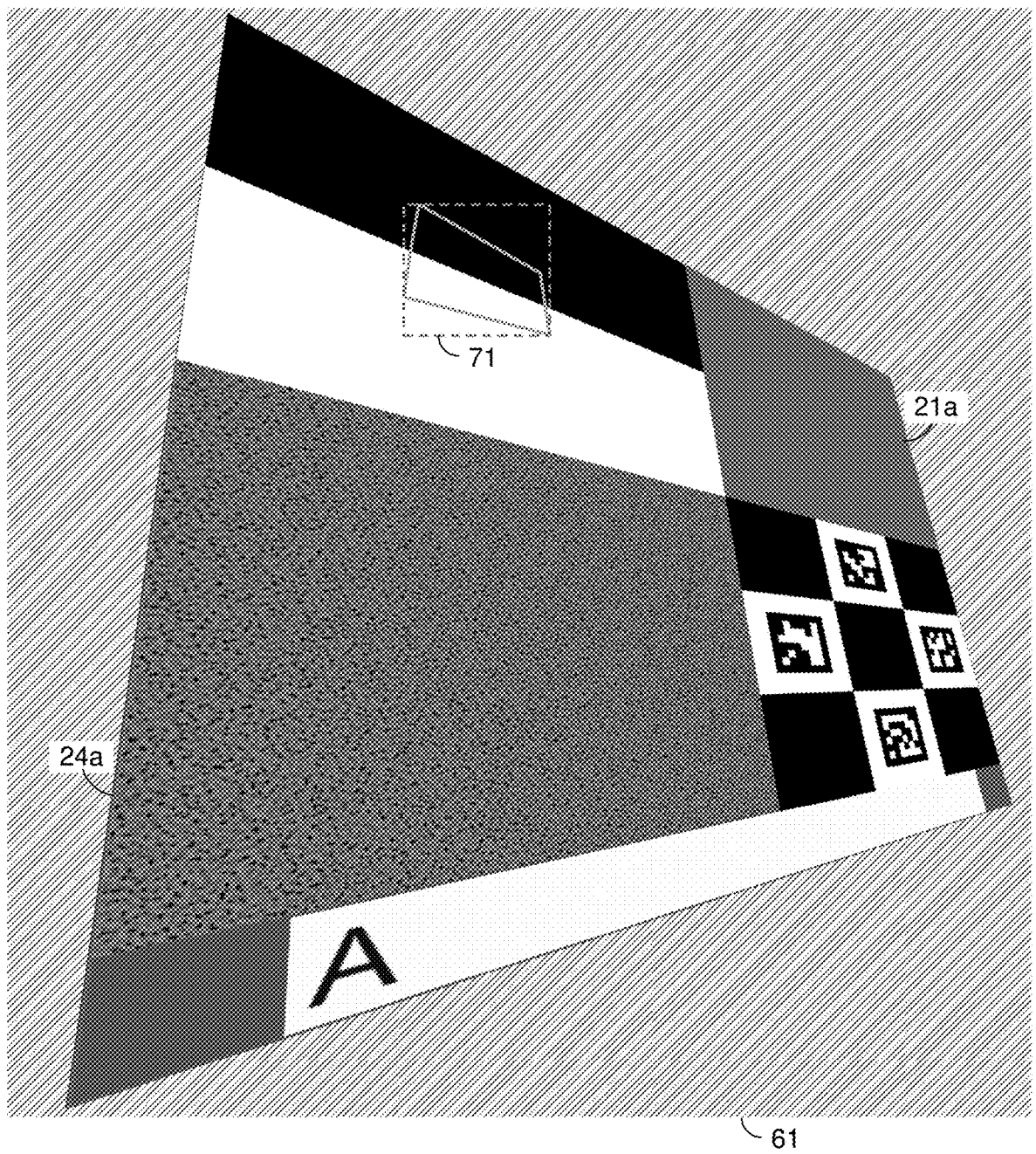
FIG. 7 shows a row- and column-aligned region of pixels in the camera-captured imagery that encompasses the region of interest.

FIG. 7 shows the flat region and the noise region, 21a and 24a, in the raw sample image, i.e., as output by the camera system, and after any image signal processing performed by the system has been applied. If mapped back to the ground truth space, by the earlier-determined homography, the mapped flat region 21*a* should near-identically match the original ground truth region 21. Similarly, the mapped noise region 24*a* should near-identically match the original noise region 24. If they don't closely match, then the imagery has been processed in some manner.

There are various quality metrics that can be used to determine whether two image regions closely match. One is normalized cross-correlation. However, in view of the homography mapping that is involved, which is necessarily an estimation, we prefer to use a measure of similarity that allows for some "slop" in spatial correspondence between the two corresponding regions. One metric that allows for such slop examines correlations at different row/column offsets within a small neighborhood, such as 5 pixels. The peak among such correlations is then used as indicative of the degree of match between the two regions. One expression of such a metric (which we term a "signal presence metric") is:

$$N_{tf}[i, j] = \frac{\sum_m \sum_n ((f[m, n] - \mu_f) \times (t[m-i, n-j] - \mu_t))}{\sqrt{\sum_m \sum_n t^2[m-i, n-j]}}$$

where f is the received imagery depicting the pattern; t is a patch excerpt from the ground truth image data for the pattern; i,j are dimensions of the patch t; m,n are pixels in the patch t, and $\mu_f$, $\mu_t$ are the average values for f and t respectively. It will be recognized that this expression also differs from more common cross-correlation expressions by normalizing the numerator with the mean of the two image data. This makes the metric invariant to variations in luminance between the ground truth and raw sampled images.

To sense degradation of the imagery, we compute two such correlation metrics, and compare them.

The first metric, M1, is the correlation between (a) the camera-sensed noise region 24*a* after mapping back into the ground truth coordinate system, and (b) the original ground truth noise region 24. This correlation should be very high unless, e.g., an image signal processor has applied denoising, changing the appearance of the camera-sensed noise region, or noise levels are so high as to mask the signal.

The second metric, M2, is correlation between (a) the camera-sensed noise region 24*a* after mapping back into the ground truth coordinate system, and (b) the camera-sensed flat region 21*a* after mapping back into the ground truth coordinate system. This second correlation should be very low, since the noise region and flat region are very dissimilar. If the correlation is not low, this suggests that high frequency noise has been introduced into the camera-sensed flat region. Or, alternatively, it suggests that noise has been suppressed from the camera-sensed noise region, i.e., making it more flat.

Desirably, the first metric should be high and the second metric should be low. A combined metric can be created from these two data. One such combined metric is the first metric minus the second metric, M1-M2, yielding a number that is large for captured imagery that faithfully matches the ground truth imagery, and is small for captured imagery that is degraded. Another such combined metric is the first metric divided by the second metric, M1/M2, again yielding a relative quality measure where larger is better. It will be apparent that many other such combinations of metrics can be devised, all based on similar measures of image region similarity.

These metrics can be computed from each image frame in a sequence of image frames captured during a test procedure. At the end of the procedure, the average of all of the computed metrics can be reported, together with the high- and low-composite metrics. Such information collected for a first camera system can be compared with that of a second camera system to judge which of two systems is superior. Relatedly, such information collected from a first camera system can be compared against information earlier collected from that camera system, to determine if performance of the system has been impaired.

If the noise region 24 contains a digital watermark, the image region 24*a* depicting the digital watermark in the raw sample image can be identified and passed to a software detector to derive additional signal metrics. Identification of the watermarked image region can proceed in a manner analogous to the identification of region of interest 51*a*, e.g., by using the fiducial-determined homography to map the pixel coordinates of watermarked region 24 in the ground truth image into counterpart coordinates in the raw sampled image. A superset block of the raw sampled image that encompasses those pixels is then selected for watermark decoding. Much of the normal watermark detection process is consumed in determining where, within the captured image frame, a watermark signal is located. By use of the above technique, this process is greatly speeded.

The other computationally-intensive part of detecting a watermark concerns estimating its pose. This operation, too, can be shortcut by use of the homography-determined pose parameters. These parameters can be provided to the watermark detector, which can then iterate from this close starting point, e.g., using the direct least squares method detailed in U.S. Pat. Nos. 9,959,587 and 10,242,434.

Once the watermark signal is identified, and its pose is determined, a variety of signal metrics can be determined. These include Linear Grid Strength, Relative Signal Strength, and Message Correlation, e.g., as disclosed in U.S. Pat. Nos. 10,506,128 and 10,217,182.

From the foregoing, it will be recognized that different metrics can be generated from field-captured imagery of a test card to indicate/predict the performance of an imaging system.

CONCLUDING REMARKS

Having described and illustrated the principles of the technology with reference to illustrative embodiments, it will be recognized that the technology can be implemented in many other, different, forms.

For example, while the description references various OpenCV functions, it should be apparent that such functionality can be achieved in other ways. For example, to find keypoints in the raw sample image that correspond to keypoints in the ground truth image, SIFT (or SURF) features can be used. That is, SIFT features that characterize keypoints (e.g., corners) on the test target can be determined, and the raw sample image can then be analyzed to find corners whose SIFT features most closely-match. (SIFT is well known to artisans from the work of David Lowe and others. See, e.g., Lowe's U.S. Pat. No. 6,711,293.)

Similarly, it is not necessary to use the illustrated ArUco markers. The illustrated markers use a pre-defined ArUco dictionary, termed DICT_6×6_50. Other ArUco patterns can alternatively be employed. More generally, patterns outside the ArUco family can be used, such as QR codes. Still further, simple checkerboards and grid patterns can be used as fiducials, albeit without the payload capacity.

In some embodiments, the raw sample noise pattern and/or the homography-projected noise pattern can be filtered prior to determining the above-detailed metrics M1 and/or M2. In some embodiments the filter is a non-linear filter. An oct-axis filter is one example of a non-linear filter. Oct-axis filtering is detailed in the below-cited watermark patents, and also in U.S. Pat. No. 10,515,429. (Briefly, oct-axis filtering includes, for each of plural pixels in image data, assigning a filtered value to the subject pixel based on a count of neighboring pixels that have an original value higher than an original value of the subject pixel.) Reference is made herein to a noise pattern (or a noise-like pattern). For the avoidance of doubt, such a pattern is here regarded as a 2D signal of size N×N (e.g., 600 pixel×600 pixels, or 3×3 inches), in which pairs of nearby signal samples are relatively uncorrelated. "Relatively uncorrelated" means an absolute correlation value of less than 0.25. "Nearby" means samples that are spaced a distance of N/50 apart. In a one particularly preferred embodiment, samples that are spaced a distance of N/50 apart exhibit a correlation of less than 0.1. In another particularly preferred embodiment, samples that are spaced a distance of N/100 apart exhibit a correlation of less than 0.2 (or less than 0.1).

It should be recognized that the illustrated test card can serve additional purposes. These include performing camera calibration, and assessing peak signal-to-noise ratio of the imaging system. This latter parameter can be assessed by first determining a mean squared error between a noise-free image I of size m×n pixels, and its noisy approximation K, by the formula:

$$MSE = \frac{1}{mn}\sum_{i=0}^{m-1}\sum_{j=0}^{n-1}[I(i,j) - K(i,j)]^2$$

From the mean squared error, the peak signal-to-noise ratio, in decibels, can be computed as:

$$PSNR = 10 \cdot \log_{10}\left(\frac{MAX_I^2}{MSE}\right)$$

where $MAX_I$ is the maximum possible pixel value of the image (e.g., 255 in an 8-bit system). This operation can be performed, e.g., on the noise-free pattern 24, and the counterpart pattern 24*a* after projection, per the homography matrix, back into the original pose.

It should be understood that routine aspects of the detailed arrangements are not belabored. Camera calibration is one such aspect. Either in a previous operation, or in connection with the homography, the camera matrix and corresponding distortion vector are determined, and are applied to remove distortion from the captured imagery.

Although conceived as a software application that is run, e.g., on a laptop computer in the field, where the image data is collected, it should be recognized that the detailed processes can be executed otherwise, e.g., as a remote web service.

While the homography gives scale data, some tests require absolute distance information. As will be understood by artisans, the ratio of the height of the flat patch on the card divided by its projected height on the camera photosensor, equals the ratio of the distance to the card divided by the lens focal length. So by knowing the card and photosensor size and the lens focal length, the distance to the card can be determined.

For purposes of this patent application, a watermark is a 2D code produced through a process that represents a message of N symbols using K output symbols, where the ratio N/K is less than 0.2. (In convolutional coding terms, this is the base rate, where smaller rates indicate greater redundancy and thus greater robustness in conveying information through noisy "channels"). In particularly preferred embodiments, the ratio N/K is 0.1 or less. Due to the small base rate, a payload can be decoded from a watermark even if half of more (commonly three-quarters or more) or the code is missing.

In an exemplary embodiment, 47 payload bits are concatenated with 24 CRC bits, and these 71 bits ("N") are convolutionally encoded at a base rate of 1/13 to yield 924 bits ("K"). A further 100 bits of version data are appended to indicate version information, yielding 1024 bits (which are then scrambled and spread to yield 16,384 values in a 128×128 waxel watermark array).

Some other 2D codes make use of error correction, but not to such a degree. A QR code, for example, if encoded with the highest possible error correction level, can recover from only 30% loss of the code.

Preferred watermark embodiments are also characterized by a synchronization (reference) signal component that is expressed where message data is also expressed. For example, every waxel in a watermark pattern is typically a function of the synchronization signal. Again in contrast, synchronization in QR codes is achieved by alignment patterns placed at three corners and at certain intermediate cells. Message data is expressed at none of these locations.

Digital watermark technologies that can be used in the detailed embodiments are disclosed in U.S. Pat. Nos. 11,062,108, 9,245,308, 7,483,547 and 6,590,996.

It will be understood that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The processes and system components detailed in this specification can be implemented as instructions for computing devices, including general purpose processor instructions for a variety of programmable processors, such as microprocessors and systems on a chip (e.g., the Intel Atom and i9 series, the ARM A8 and Cortex series, the Qualcomm Snapdragon, and the nVidia Tegra 4). Implementation can also employ a variety of specialized processors, such as graphics processing units (GPUs, such as are included in the nVidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC).

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

This specification has disclosed different embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the technology.

The invention claimed is:

1. A method employing an optical test card to assess performance of a camera system, the optical test card comprising a substrate with plural regions including a first region printed with a uniform grey tone and a second region printed with a pattern, the pattern comprising a noise pattern or a 2D machine readable code, the method comprising:
    receiving imagery depicting said uniform grey tone in the first region and the pattern in the second region, the received imagery corresponding to image data previously captured by the camera system from the optical test card;
    determining a first quality metric for the received imagery, in which the first quality metric indicates correlation between (a) depiction of the uniform grey tone, and (b) depiction of the pattern;
    determining a second quality metric for the received imagery based on depiction of the pattern; and
    combining the first quality metric and the second quality metrics to yield a composite quality metric, the composite quality metric indicating performance of the camera system.

2. The method of claim 1 in which said combining comprises computing a ratio between the first quality metric and the second quality metric.

3. The method of claim 1 in which the second quality metric indicates correlation between depiction of the pattern, and ground truth image data for the pattern.

4. The method of claim 3 in which the ground truth image data comprises original sample values for the pattern, unaffected by printing and imaging.

5. The method of claim 4 wherein the second quality metric is a normalized cross-correlation metric.

6. The method of claim 5 in which the normalized cross-correlation metric is a signal presence metric of the form:

$$N_{tf}[i, j] = \frac{\sum_m \sum_n ((f[m, n] - \mu_f) \times (t[m - i, n - j] - \mu_t))}{\sqrt{\sum_m \sum_n t^2[m - i, n - j]}}$$

where f is the received imagery depicting the pattern; t is a patch excerpt from the ground truth image data for the pattern; i,j are dimensions of the patch t; m,n are pixels in the patch t, $\mu_f$, $\mu_t$ are the average values for f and t respectively, and N is the neighborhood over which the score is maximized.

7. The method of claim 1 wherein the pattern is a continuous tone digital watermark.

8. The method of claim 1 wherein the pattern is a continuous tone chrominance digital watermark or a continuous tone luminance digital watermark.

9. The method of claim 1 that includes:
determining a homography that expresses viewpoint distortion of the optical test card as depicted in image data captured by the camera system;
resampling the image data captured by the camera system in accordance with said determined homography, said resampling yielding resampled image data; and
employing the resampled image data as said received imagery.

10. A method employing an optical test card to assess performance of a camera system, the optical test card comprising a substrate with plural regions including a first region printed with a uniform grey tone and a second region printed with a pattern, the pattern comprising a noise pattern or a 2D machine readable code, the method comprising:
receiving imagery depicting said uniform grey tone in the first region and the pattern in the second region, the imagery corresponding to image data previously captured by the camera system from the optical test card;
filtering the imagery from the camera system with a non-linear filter, in which said filtering comprises, for each of plural pixels in the imagery, assigning a filtered value to said each of plural pixels based on a count of neighboring pixels that have an original value higher than an original value of said each of plural pixels, said filtering yielding filtered imagery;
determining a first quality metric for the filtered imagery based on depiction of the uniform grey tone;
determining a second quality metric for the filtered imagery based on depiction of the pattern; and
combining the first quality metric and the second quality metric to yield a composite quality metric, the composite quality metric indicating performance of the camera system.

11. An optical test card useful in assessing performance of a camera system, the optical test card comprising:
a substrate with plural regions including:
(i) a first region printed with a uniform grey tone having an area of at least one square inch;
(ii) a second region printed with a noise-like pattern having an area of at least one square inch; and
(iii) a third region printed with a black area and an adjoining white area defining a knife-edge boundary that spans the third region; and
at least one machine-readable marker printed on the substrate that enables determination of viewpoint distortion of imagery depicting the optical test card and encodes metadata about the optical test card.

12. The optical test card of claim 11 in which the noise-like pattern is comprises a digital watermark pattern.

13. The optical test card of claim 11 in which said third region includes an area of at least one square inch.

* * * * *